United States Patent [19]

Nelson et al.

[11] Patent Number: 4,991,229
[45] Date of Patent: Feb. 5, 1991

[54] OPTICAL TRANSMITTER POWER MEASUREMENT AND CONTROL

[75] Inventors: Larry A. Nelson; James W. Woods, both of Albuquerque, N. Mex.

[73] Assignee: Honeywell Inc., Minneapolis, Minn.

[21] Appl. No.: 331,866

[22] Filed: Apr. 3, 1989

[51] Int. Cl.$^5$ .............................................. G02F 1/00
[52] U.S. Cl. ................................. 455/605; 455/609; 455/613; 455/618; 370/3; 356/349; 356/352; 356/354; 356/126
[58] Field of Search ............... 455/605, 609, 613, 618; 370/3; 356/349, 352, 354, 126

[56] References Cited

U.S. PATENT DOCUMENTS

| | | | |
|---|---|---|---|
| 4,215,323 | 7/1980 | McCall, Jr. | 455/609 |
| 4,307,469 | 12/1981 | Casper et al. | 455/618 |
| 4,484,144 | 11/1984 | Nakagome et al. | 455/609 |
| 4,485,475 | 11/1984 | Large et al. | 455/609 |
| 4,709,416 | 11/1987 | Patterson | 455/609 |
| 4,805,235 | 2/1989 | Henmi | 455/618 |
| 4,817,098 | 3/1989 | Horikawa . | |

*Primary Examiner*—Donnie L. Crosland
*Attorney, Agent, or Firm*—Haugen and Nikolai

[57] ABSTRACT

A fiber optic transmission system including a fiber optic link. Transmitting apparatus transmits an optical signal having a concentration of energy at a particular wavelength. Routing apparatus then routes optical signals in response to the concentration of energy at the particular wavelength of the transmitted optical signal. The routing apparatus is disposed to receive the transmitted optical signal and also reflects a small portion of the transmitted optical signal. A first apparatus for receiving the reflected portion of the optical signal is disposed to cooperate with the routing apparatus and further has apparatus for converting the reflected portion into a control signal. Temperature sensing apparatus is disposed to sense temperature variations in the first receiving apparatus and apparatus for controlling the transmitting apparatus is adapted to receive the control signal and further is disposed so as to regulate the transmitting appratus responsively to the control signal. The controlling apparatus further operates to regulate the power of the transmitting apparatus as a function of temperature sensed by the temperature sensing apparatus so as to maintain a preselected power margin in the fiber optic link.

22 Claims, 2 Drawing Sheets

OPTICAL TRANSMITTER POWER MEASUREMENT AND CONTROL

RELATED APPLICATION

This application is related to applicant's co-pending U.S. patent application Ser. No. 275,935, filed Nov. 25, 1988 and entitled "Fiber Optic Link Noise Measurement and Optimization System".

FIELD OF THE INVENTION

The invention is directed generally to optical transmitter power measurement and control apparatus and, more particularly, to an optical transmitter power measurement and control apparatus which measures the optical power output of a full duplex fiber optic link (FOL) and controls the power output without affecting the optical power budget.

BACKGROUND OF THE INVENTION

In the applications of FOLs, it is very useful to isolate failures to a particular transmitter or receiver and to control the optical output power of the transmitter in the presence of environmental changes or transmitter aging. To do this, the optical power output of the transmitter must be monitored. This monitoring is best done without an optical power budget penalty. In prior art devices, an optical power splitter is inserted into the optical path in order to isolate faults. The addition of this component reduces the power budget available for the optical path since it has a significant power loss.

The invention accomplishes output power monitoring without the need for additional components such as the power splitter of the prior art. The invention utilizes a feature of wavelength division multiplexers (WDMs) typically already included in FOLs. Wavelength division multiplexers are used in fiber optic links to allow full duplex operation over single fibers. A functional diagram of a WDM is shown in FIG. 1. Within the WDM, a spectrally selective mirror routes light of different wavelengths to different outputs. During this routing process, a small portion of the transmitter output is reflected off of the mirror as shown by the light ray marked C. This reflected light contains about 10% of the transmitted energy and occurs as a natural consequence of characteristics inherent in the construction of a spectrally selective mirror. In known fiber optic systems such reflections generally result in wasted light energy. The invention provides a means for utilizing the reflected energy which would otherwise be discarded. In this way the invention does not affect the power budget of a conventional WDM optical system while providing additional measurement and control capabilities.

Using the principles of the invention, a full duplex fiber optic transmission system is designed incorporating two wavelength division multiplexers. The WDMs are designed to route the reflected light from the transmitter to an optical detector.

SUMMARY OF THE INVENTION

A fiber optic transmission system, including a fiber optic link and means for measuring and controlling the optical power output of a full duplex fiber optic link without affecting the optical power budget is disclosed. The system includes means for transmitting an optical signal which has a concentration of energy at a particular wavelength to a means for routing optical signals in response to the concentration of energy at the particular wavelength of the transmitted optical signal wherein the routing means is disposed to receive the transmitted optical signal and reflects a small portion of the transmitted optical signal. First means for receiving the reflected portion of the optical signal is disposed to cooperate with the routing means and further has a means for converting the reflected portion into a control signal. Temperature sensing means is disposed to sense temperature variations in the first receiving means. Means for controlling the transmitting means is adapted to receive the control signal and is further disposed so as to regulate the transmitting means responsively to the control signal and further operates to regulate the power of the transmitting means as a function of temperature sensed by the temperature sensing means so as to maintain a preselected optical power margin for the fiber optic link.

In an alternative embodiment of the invention, the controlling means is replaced by a decision circuit which may provide a signal indicating that transmission from the transmitting means has fallen below a predetermined level.

Yet another alternative embodiment of the invention comprises apparatus for detecting faults in any one of a plurality of fiber optic transmitters including switching means controlled by a controlling means so as to operate any one of a series of transmitters in order to determine whether or not each transmitter is operating within acceptable limits. A fault indication is provided if they fall outside of such limits.

It is one object of the invention to provide an optical transmitter power measurement and control system for use with fiber optic links.

It is yet another object of the invention to provide a system which measures and controls the optical power output of a full duplex fiber optic link without affecting the optical power budget.

It is yet another object of the invention to provide apparatus for detecting faults in any one of a plurality of fiber optic transmitters in a plurality of fiber optic links without affecting the optical power budget of any one of the fiber optic links.

Other objects, features and advantages of the invention will become apparent to those skilled in the art through the description of the preferred embodiment, claims and drawings herein wherein like numerals refer to like elements.

DESCRIPTION OF THE PREFERRED EMBODIMENT

Figure 1A:
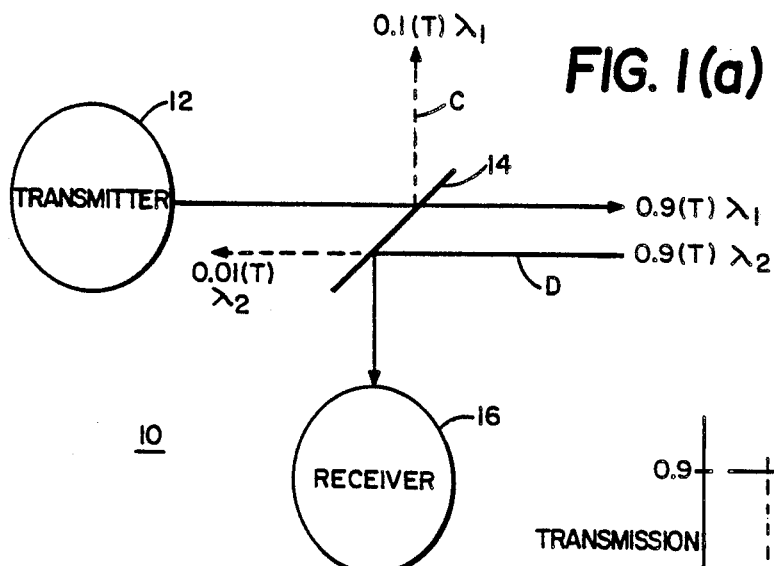
FIGS. 1A and 1B schematically show a diagram of the wavelength division multiplexing scheme as employed by an embodiment of the invention.
Figure 1B:
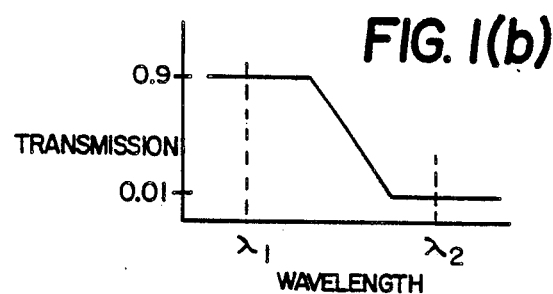

Referring now to FIG. 1(a), a schematic diagram of the wavelength division multiplexing as employed by the invention as shown. A fiber optic link 10 is shown comprising transmitter 12, spectrally selective mirror 14 (also called a wavelength division multiplexer) and receiver 16. As those skilled in the art will appreciate, mirror 14 may comprise a substrate which caries either optical coatings or an interference grating of the types well known in the art. An optical signal, for example, in the form of a light beam having a concentration of energy at a particular wavelength $\lambda_1$ is transmitted from transmitter 12 onto mirror 14. Approximately 90% [0.9(T)] of the optical signal is transmitted through the mirror to an output. About 10% of the power in the optical signal is reflected as shown by light ray C. Light ray D represents an optical signal having a concentration of energy at a second wavelength $\lambda_2$ generated by an external optical source through another mirror not shown. Optical signal D reflects off of mirror 14 and is received by optical receiver 16. About 1% of the optical signal D is transmitted through mirror 14. FIG. 1(b) is a graphical representation of the transmission characteristics of mirror 14. As can be seen with reference to that Figure, mirror 14 is spectrally selective and will transmit light concentrated at wavelength $\lambda_1$ while reflecting almost all of the light received which is concentrated at a second wavelength, $\lambda_2$. Such spectrally selective mirrors are well known by those skilled in the art, the wavelengths selected and mirrors will be determined by the particular design parameters in any given situation.

Figure 2:
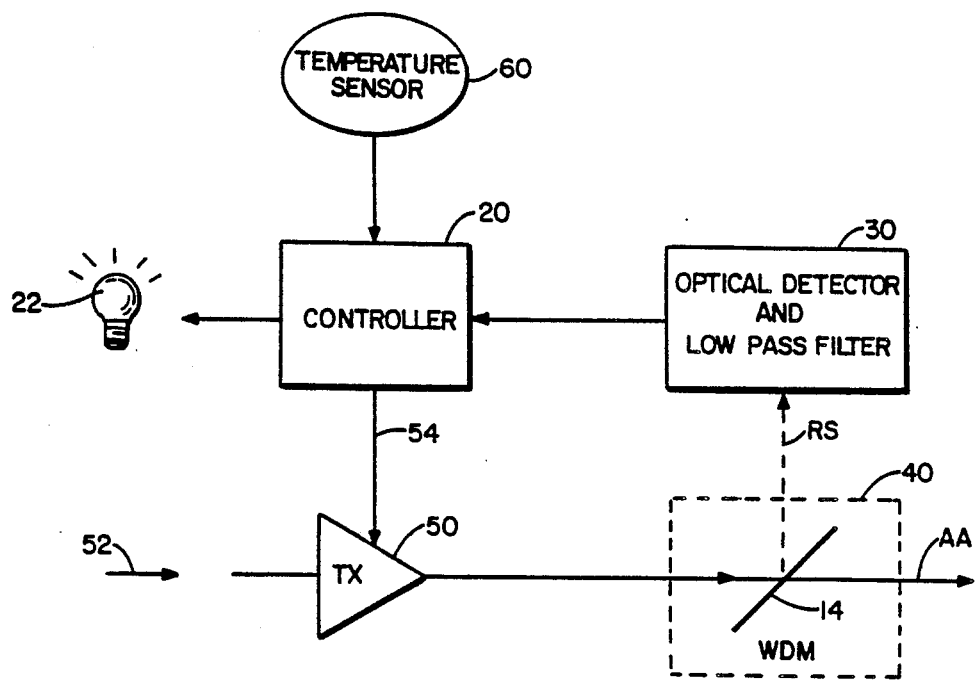
FIG. 2 schematically illustrates one embodiment of the invention including a transmitter output power control and fault indication.

Referring now to FIG. 2, an embodiment of the invention is shown which provides a transmitter output power control and fault indication. The transmitter output power control and fault indication system shown comprises a controller 20, an optical detector and low pass filter 30, a WDM 40, a transmitter 50 and a temperature sensor 60. The transmitter receives a modulated input 52 and transmits it to the WDM 40. The transmitter 50 may advantageously be an LED or laser transmitter having a drive line 54 connected to the controller 20. Controller 20 controls the output power of the transmitter 50 through driveline 54. The WDM 40 receives the transmitter output and transmits most of the signal as indicated by optical path AA. However, a small portion of the optical signal from transmitter 50 is reflected from the mirror 14 in WDM 40 as shown by dotted line RS into an optical detector and low pass filter 30. Optical detector and low pass filter 30, in turn, converts the reflected optical signal into electrical energy by means of an optical detector. The low pass filter which is inherent in receiving means 30 removes the non-DC portion of the detected signal and decreases the ratio of the RMS value to the mean value of the resulting signal. This improves the signal/noise ratio of the detected signal and allows detection with very small amounts of input optical energy. The converted signal is then transmitted to controller 20. Since this energy is normally lost in WDMs, the addition of the detector does not impact the normal system optical power budget. The magnitude of the detected signal is determined by the controller through well known circuit apparatus. The controller ensures that the transmitter is launching the proper amount of power by increasing or decreasing the transmitter's output power. The modification of the transmitter's output power may be done advantageously by changing the LED drive current in LED drive line 54. Such control logic and circuitry is well known. The temperature sensor 60 provides an input signal representative of the detector temperature to the controller to enable the controller to compensate for detector sensitivity changes due to temperature fluctuations. Those skilled in the art will recognize that optical detector sensitivity decreases as temperature increases. Thus, the controller regulates the transmitter power output as a function of temperature to maintain a preselected power margin in the FOL. The controller also provides a fault indication 22 if the transmitter optical output power has ceased or has become insufficient for adequate power margin.

Figure 3:
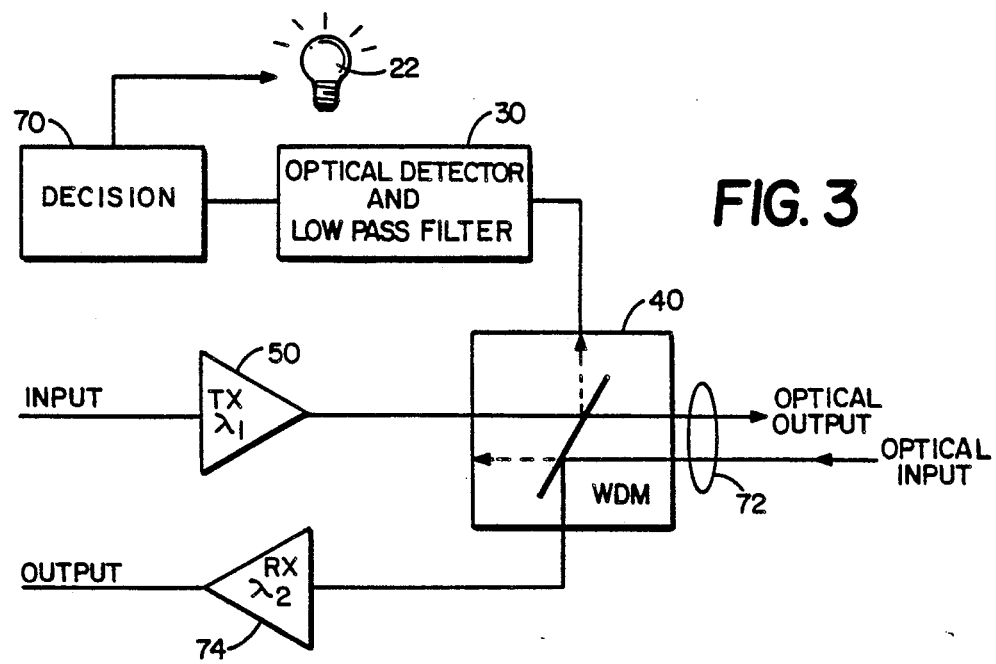
FIG. 3 schematically shows an optical circuit employing the principles of the invention for providing fault isolation of a single fiber optic transmitter.

FIG. 3 illustrates a system design for a fault indication of a single FOL. This system comprises a decision means 70, a receiving means 30, which may advantageously include an optical detector and low pass filter as described hereinabove with reference to FIG. 2, a WDM 40, a transmitter 50, a fiber 72, and a second means for receiving an optical signal 74. The system of FIG. 3 operates similarly to the system shown in FIG. 2, however, the controller is replaced by a decision circuit 70 which measures the optical power output of the transmitter as detected and converted into electrical energy by the first receiving means 30 and provides an indication 22 if optical transmission falls below a predetermined power level. The second receiving means 74 receives a second optical input of energy concentrated at wavelength $\lambda_2$ from an optical source not shown. A second receiving means would be advantageously employed in a full duplex FOL.

Figure 4:
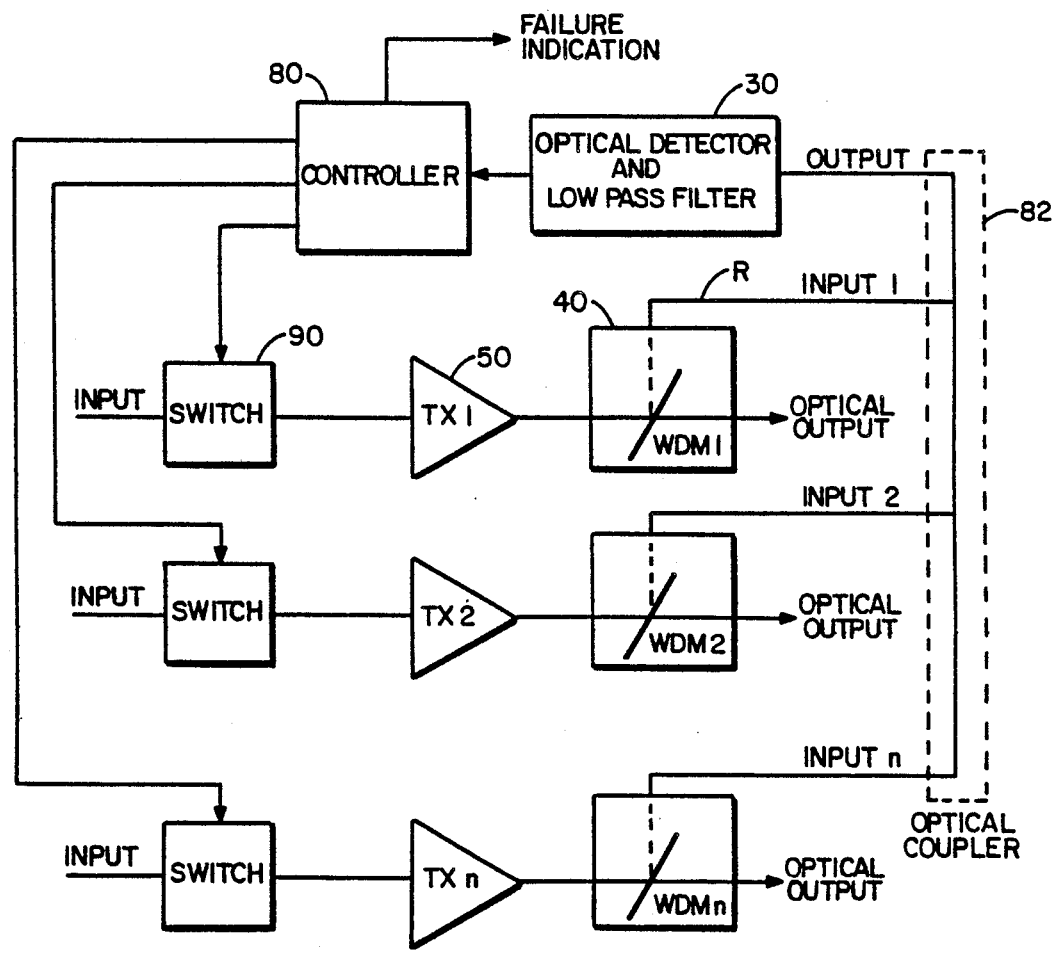
FIG. 4 schematically shows a system employing the principles of the invention for fault isolation of a plurality of a fiber optic transmitters.

FIG. 4 illustrates schematically a system designed for fault isolation of a plurality of transmitters. In this system, the reflected transmitter output R of multiple WDMs 40 (numbered WDM 1 to WDM N) are coupled together optically and routed to an optical detector 30. The detector interfaces to the controller 80. The controller 80 tests each transmitter individually by switching each switch 90 "on" individually using well known switching logic and measuring the optical output power. The fault indication signal flags link failures and identifies the faulty individual transmitter. Optional driver control lines may also be included to provide power control of the transmitters from the controller as shown by Line 54 in FIG. 2. As those skilled in the art will recognize, in this way any number of transmitters can be tested and controlled by a controller adapted to route inputs through switches to individual transmitters so as to allow the inputs to pass through the switches when the switches are closed and to block the inputs for any switches which are open.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A fiber optic transmission system including a fiber optic link comprising:
   (a) means for transmitting an optical signal having a concentration of energy at a particular wavelength;
   (b) means for routing optical signals in response to the concentration of energy at the particular wavelength of the transmitted optical signal wherein the routing means is disposed to receive the transmitted optical signal and reflects a small portion of the transmitted optical signal;
(c) first means for receiving the reflected portion of the optical signal disposed to cooperate with the routing means, the receiving means further including a means for converting the reflected portion into a control signal;
(d) means for sensing temperature disposed to sense temperature variations in the first receiving means; and
(e) means for controlling the transmitting means adapted to receive the control signal and further being disposed so as to regulate the transmitting means responsively to the control signal, and wherein the controlling means further operates to regulate the power of the transmitting means as a function of temperature sensed by the temperature sensing means so as to maintain a preselected power margin in the fiber optic link.

2. The apparatus of claim 1 wherein the routing means comprises a spectrally selective mirror which routes light of different wavelength to different outputs.

3. The apparatus of claim 1 wherein the portion of the reflected optical signal is about 10%.

4. The apparatus of claim 1 wherein the routing means comprises a wavelength division multiplexer.

5. The apparatus of claim 1 wherein the transmitting means is a laser.

6. The apparatus of claim 1 wherein the transmitting means is an LED.

7. The apparatus of claim 1 further including a second means for receiving the portion of the optical signal transmitted through the routing means.

8. The apparatus of claim 1 wherein the controlling means further operates to provide a fault signal in response to the control signal.

9. The apparatus of claim 8 wherein the first receiving means comprises an optical detector and low pass filter.

10. Apparatus for detecting faults in any one of a plurality of fiber optical transmitters wherein each of the transmitters can be enabled through an input to transmit an optical signal having a concentration of energy at a particular wavelength, the apparatus comprising:
(a) means for controlling including means for providing a fault indication signal, a plurality of parallel control lines and at least one input for receiving data wherein the controlling means provides control signals;
(b) a plurality of switches, each switch having a first input for receiving electrical data, a second input for receiving one of the control signals which operates so as to open and close the switch, and an output connected to at least one corresponding transmitter input, wherein the plurality of switches are controlled individually by the controlling means so as to enable their corresponding transmitters individually;
(c) a plurality of means for routing optical signals in response to the concentration of energy at a particular wavelength of the transmitted optical signal wherein each of the routing means is disposed to receive the transmitted optical signal and reflects a small portion of the transmitted optical signal;
(d) means for coupling the reflected signals from each of the routing means; and
(e) means for detecting the reflected signal coupled by the coupling means where the detecting means transmits a detection signal to the controlling means and the controlling means operates responsively to the detection signal in providing a fault indication signal.

11. The apparatus of claim 10 wherein the routing means comprises a spectrally selective mirror which routes light of different wavelengths to different outputs.

12. The apparatus of claim 10 wherein the portion of the reflected optical signal is about 10%.

13. The apparatus of claim 10 wherein the routing means comprises a wavelength division multiplexer.

14. The apparatus of claim 10 wherein the transmitting means is a laser.

15. The apparatus of claim 10 wherein the transmitting means is an LED.

16. The apparatus of claim 10 further including a second means for receiving the portion of the optical signal transmitted through the routing means.

17. Apparatus for fault isolation of at least one fiber optic transmitter comprising:
(a) means for transmitting an optical signal having a concentration of energy at a particular wavelength;
(b) means for routing optical signals in response to the concentration of energy at a particular wavelength of the transmitted optical signal wherein the routing means is disposed to receive the transmitted optical signal and reflects a small portion of the transmitted optical signal;
(c) first means for receiving the reflected portion of the optical signal disposed to accept the reflected portion from the routing means and having further a means for converting the reflected portion into a control signal; and
(d) means for deciding whether the control signal indicates that transmission from the transmitting means has fallen below a predetermined level.

18. The apparatus of claim 17 wherein the routing means comprises a spectrally selective mirror which routes light of different wavelengths to different outputs.

19. The apparatus of claim 17 wherein the portion of the reflected optical signal is about 10%.

20. The apparatus of claim 17 wherein the routing means comprises a wavelength division multiplexer.

21. The apparatus of claim 17 wherein the transmitting means is a laser.

22. The apparatus of claim 17 wherein the transmitting means is an LED.

* * * * *